(12) United States Patent
Schoenfeld et al.

(10) Patent No.: US 10,461,463 B2
(45) Date of Patent: Oct. 29, 2019

(54) SEALING INSERT

(71) Applicant: HARTING Electric GmbH & Co. KG, Espelkamp (DE)

(72) Inventors: Alexander Schoenfeld, Osnabrueck (DE); Stefan Schnieder, Bohmte (DE)

(73) Assignee: HARTING ELECTRIC GMBH & CO. KG (DE)

( * ) Notice: Subject to any disclaimer, the term of this patent is extended or adjusted under 35 U.S.C. 154(b) by 0 days.

(21) Appl. No.: 16/167,274

(22) Filed: Oct. 22, 2018

(65) Prior Publication Data
US 2019/0237901 A1    Aug. 1, 2019

(30) Foreign Application Priority Data

Jan. 26, 2018   (DE) .................. 10 2018 101 790

(51) Int. Cl.
| | | |
|---|---|---|
| H01R 13/52 | (2006.01) | |
| F16L 5/10 | (2006.01) | |
| H02G 3/22 | (2006.01) | |
| H01R 13/502 | (2006.01) | |
| H01R 13/512 | (2006.01) | |
| H01R 13/518 | (2006.01) | |

(52) U.S. Cl.
CPC ............ H01R 13/5208 (2013.01); F16L 5/10 (2013.01); H01R 13/5025 (2013.01); H01R 13/512 (2013.01); H01R 13/518 (2013.01); H02G 3/22 (2013.01)

(58) Field of Classification Search
CPC ................................. H02B 1/30; H02G 15/113
USPC .................... 439/578, 760; 339/94; 174/77 R
See application file for complete search history.

(56) References Cited

U.S. PATENT DOCUMENTS

| | | | | |
|---|---|---|---|---|
| 4,581,481 A | * | 4/1986 | Moretti ..................... | H02G 1/02 16/109 |
| 4,655,424 A | * | 4/1987 | Oshida ...................... | F16L 3/13 24/545 |
| 4,802,646 A | * | 2/1989 | Cattani .................. | F16L 3/1203 24/20 CW |
| 4,840,345 A | * | 6/1989 | Neil .......................... | F16L 3/12 24/16 PB |
| 5,502,281 A | * | 3/1996 | Schoelling ........... | H02G 15/113 174/77 R |
| 5,725,185 A | * | 3/1998 | Auclair ..................... | F16L 3/12 248/73 |

(Continued)

FOREIGN PATENT DOCUMENTS

| | | | | |
|---|---|---|---|---|
| DE | 3832228 | | 10/1989 | .............. E04F 17/08 |
| DE | 29601998 | | 4/1996 | ........... H01R 13/514 |

(Continued)

OTHER PUBLICATIONS

German Office Action (w/machine translation) issued in application No. 10 2018 101 790.1, dated Aug. 13, 2018 (8 pgs).

*Primary Examiner* — Tulsidas C Patel
*Assistant Examiner* — Peter G Leigh
(74) *Attorney, Agent, or Firm* — Hayes Soloway P.C.

(57) ABSTRACT

The aim is to insert cables into a housing with the minimum possible manual effort. In particular, the housing can be the housing of a plug connector, which possesses a modular system. To this end, the use of special pre-opened sealing inserts is proposed to facilitate the corresponding assembly effort and even enable simplified mechanical fitting.

20 Claims, 4 Drawing Sheets

(56) References Cited

U.S. PATENT DOCUMENTS

| | | | | |
|---|---|---|---|---|
| 5,775,702 | A * | 7/1998 | Laeremans | H02G 15/013 277/314 |
| 6,004,162 | A | 12/1999 | Harting et al. | 439/701 |
| 6,118,076 | A * | 9/2000 | Damm | H02G 15/113 174/77 R |
| 6,149,164 | A * | 11/2000 | Kreutz | H02G 3/088 277/628 |
| 6,190,249 | B1 * | 2/2001 | Karubian | A22B 5/14 24/339 |
| 6,466,727 | B1 * | 10/2002 | Leeb | G02B 6/4471 174/135 |
| 7,049,515 | B1 * | 5/2006 | Collins | H02G 3/083 16/2.1 |
| 7,107,653 | B2 * | 9/2006 | Thompson | H02G 3/30 24/16 PB |
| 7,316,591 | B2 | 1/2008 | Ferderer | 439/701 |
| 7,322,842 | B2 | 1/2008 | Dück et al. | 439/289 |
| 7,355,130 | B2 * | 4/2008 | Holman | H02G 3/088 16/2.1 |
| 7,781,684 | B2 * | 8/2010 | Stuckmann | H02G 3/088 16/2.1 |
| 8,891,928 | B2 * | 11/2014 | Marmon | G02B 6/4444 385/135 |
| 8,900,018 | B2 | 12/2014 | Riepe et al. | H01R 13/52 |
| 8,992,266 | B2 | 3/2015 | Schmidt et al. | 439/701 |
| 9,142,946 | B2 * | 9/2015 | Krager | H02G 3/32 |
| 9,225,103 | B2 * | 12/2015 | Okamoto | H01R 13/5202 |
| 9,360,648 | B2 * | 6/2016 | Rudenick | G02B 6/46 |
| 9,477,921 | B2 | 10/2016 | Troeger et al. | G06K 19/07758 |
| 9,570,899 | B2 * | 2/2017 | Tanaka | H02G 15/007 |
| 9,577,489 | B2 * | 2/2017 | Collins | H02K 1/185 |
| 9,608,374 | B2 | 3/2017 | Beischer et al. | H01R 13/639 |
| 9,632,268 | B2 * | 4/2017 | Coenegracht | H02G 15/013 |
| 9,865,959 | B2 | 1/2018 | Bertsch | H01R 13/514 |
| 9,923,307 | B2 | 3/2018 | Beischer et al. | H01R 13/639 |
| 2006/0204198 | A1 * | 9/2006 | Michiels | G02B 6/4446 385/135 |
| 2008/0318473 | A1 * | 12/2008 | Morikawa | H01R 13/5208 439/588 |
| 2010/0072761 | A1 * | 3/2010 | Tomaszewski | E05B 77/26 292/201 |
| 2015/0137461 | A1 * | 5/2015 | Coenegracht | G02B 6/4444 277/618 |
| 2015/0175803 | A1 | 6/2015 | Stoppelmann | C08L 77/06 |
| 2017/0179702 | A1 * | 6/2017 | Persson | H02G 3/22 |
| 2018/0254578 | A1 | 9/2018 | Herbrechtsmeier et al. H01R 13/518 |

FOREIGN PATENT DOCUMENTS

| | | | |
|---|---|---|---|
| DE | 19817279 | 10/1999 | B60R 16/02 |
| DE | 10119736 | 11/2001 | H02B 1/30 |
| DE | 202011050643 | 8/2011 | H01R 13/506 |
| DE | 202013103611 | 9/2013 | H01R 13/514 |
| DE | 102012107270 | 2/2014 | H01Q 1/22 |
| DE | 102012110907 | 5/2014 | H01R 13/518 |
| DE | 102013106279 | 12/2014 | H01R 13/514 |
| DE | 102013113976 | 6/2015 | H01R 13/514 |
| DE | 102015104562 | 9/2016 | H01R 13/518 |
| DE | 102015114703 | 3/2017 | H01R 13/518 |
| EP | 0860906 | 8/1998 | H01R 13/514 |
| EP | 1026788 | 8/2000 | H01R 13/513 |
| EP | 1353412 | 10/2003 | G02B 6/38 |
| EP | 1801927 | 6/2007 | H01R 13/518 |
| EP | 2510589 | 10/2012 | H01R 13/518 |
| EP | 2510590 | 10/2012 | H01R 13/506 |
| EP | 2886606 | 6/2015 | C08K 3/00 |
| EP | 2917974 | 9/2015 | H01R 13/506 |
| EP | 2979326 | 2/2016 | H01R 13/502 |
| EP | 3067993 | 9/2016 | H01R 13/518 |

* cited by examiner

SEALING INSERT

BACKGROUND OF THE INVENTION

The invention relates to a sealing insert for a cable lead-through device and to a method for inserting one or more cables into a housing.

Such sealing inserts and methods are required to insert and seal cables in devices and/or housings and/or in particular in control cabinets and/or plug connector housings and to fasten them thereto.

DESCRIPTION OF THE PRIOR ART

Sealing inserts are known in the prior art.

The printed document EP 2 886 606 B1 starts with a cable holder having a U-shaped frame and a number of sealing inserts ("sleeves") for the guiding through of cables. This cable holder possesses a U-shaped fame having two limbs and a web connecting these two limbs to one another. The cable holder furthermore possesses a number of sealing inserts. Each of these sealing inserts has at least one bore for the guiding through of a cable. The cable holder furthermore possesses a bar which, in the assembled state, connects the two limbs to one another and exerts a pressure on the sealing inserts which are fitted with cables. Starting with this prior art, the printed document proposes forming the bar and/or the frame from elastic material, wherein the two ends of the bar and the free ends of the limbs have recesses or projections which form a snap connection with one another.

The sealing inserts disclosed in the said printed document are made from an elastic material and possess a box-shaped or cube-shaped basic shape through which a cylindrical through-opening extends. In cross-section, they therefore possess a square circumference and a circular through-opening. The sealing inserts each have a slit which extends axially, i.e. in the direction of the associated through-opening, so that they can be spread apart for the purpose of laterally inserting (or laterally removing) a cable.

This prior art is disadvantageous in that the assembly involves considerable manual effort. In the end, for manual assembly, the cable must be guided with one hand and the sealing insert must be held with the other hand, which means that spreading the sealing insert apart calls for the use of a corresponding spreading tool which implies considerable additional effort. The additional slitting method step is also necessary during the production of such a sealing element, which increases the production effort. Furthermore, in particular when such sealing means are used in industrial plug connectors, the requirements in terms of their leak-tightness and, at the same time, also in terms of the holding force become increasingly high, which means that there is a constant demand for improvement in this regard in the prior art.

SUMMARY OF THE INVENTION

The object of the invention consists in taking the above-mentioned requirements into account and providing a sealing element which can be assembled manually with only a little effort.

A sealing insert for inserting at least one cable into a housing, in particular into a plug connector housing and/or the housing of a control cabinet, is formed from at least one elastically deformable material and has at least one through-opening for the guiding through of at least one cable.

The sealing insert possesses at least one slit along the through-opening, by means of which two mutually opposing slit surfaces are formed. The sealing insert can thus assume an opened state for inserting or removing the cable laterally. The sealing insert can furthermore also assume a closed state for sealing and strain relief of the cable.

The sealing insert, without the influence of external forces, is located in its opened state, in which it has a gap at its slit, by means of which the two slit surfaces are automatically separated from one another. For this reason, this automatically opened state is also referred to below as "pre-opened" state.

In the closed state, the material of the sealing insert can surround the through-opening and therefore also the cable which is possibly received therein.

Such a closed state can be brought about by the influence of external forces on the sealing insert, e.g. as a result of the sealing insert being inserted into a frame.

In the closed state, the two slit surfaces are advantageously joined together with form- and force-fit so that no gap exists between the slit surfaces. In its closed state, the sealing insert advantageously surrounds the cable guided through the through-opening with form- and force-fit for sealing and strain relief thereof.

An advantage of the invention consists in that the manual assembly effort is reduced. The need for a spreading tool is eliminated since the sealing insert is already opened ("pre-opened") in the starting state, i.e. without the influence of external forces, whereby the cable can be inserted particularly easily into the sealing insert through the opening. The cable can therefore be inserted directly into the already automatically pre-opened sealing insert using a single hand, for example, whilst the other hand is available for holding a plug connector housing, for example. For this reason, the sealing insert is particularly advantageous in particular when it is used in plug connector housings.

In an advantageous configuration, the through-opening can have a circular form in the closed state of the sealing insert for receiving cables with a circular cross-section. However, in the opened state, such a through-opening can instead have a more elongated progression, namely a compression portion, on its side opposite the gap. Since the material of the sealing insert undergoes particularly strong compression in this compression portion on closing, the through opening can assume a circular form again in the closed state.

In a preferred configuration, the sealing insert can furthermore have, in its through-opening, an internal contour whereof the shape and/or hardness can be used to establish a desired ratio and therefore a desired compromise between the said sealing and the holding force of the said strain relief.

The sealing insert, which is preferably constructed in one piece, can be formed for example from a soft plastics material ("elastomer") and/or a caoutchouc compound ("rubber"), depending on the application.

Without the influence of external forces, the gap of the sealing insert which is pre-opened thereby can have a width which is at least 5%, in particular at least 10%, preferably at least 15% and particularly preferably at least 20% of the diameter which the through-opening possesses in the closed state of the sealing insert.

The production, in particular the automated production, of such sealing inserts is advantageously simplified since the otherwise necessary slitting method step is omitted. Instead, the desired pre-opened form can be generated in an injection molding technique through the use of a corresponding injection mold.

In the injection molding technique, it is particularly easily possible to form slit surfaces on the sealing insert whereof the progression deviates from that of a plane. It is thus in particular possible to form the two mutually opposing slit surfaces as mutually matching complementary contours so that the two contact surfaces deviate from a planar progression and can furthermore be joined together in a form-fitting and in particular interlocking manner. This serves to maintain the holding force and leak-tightness of the closed sealing insert and to thereby also prevent an axial displacement of the two contact surfaces with respect to one another in the cable direction. In particular, a contour which is conventionally described as a so-called "scalloped" contour lends itself particularly well to this form, i.e. the slit surfaces both possess a scalloped form which extends in the longitudinal direction of the cable in this case and by means of which they can be joined together with form fit. However, other contours are also possible, e.g. rectangular, obtuse-angled or tapered and/or three-dimensional, e.g. spherical segment-like or pyramid-shaped contours. In particular, the latter three-dimensional contours can be particularly advantageous since they counteract both a possibly occurring radial offset and also an axial offset of the slit surfaces with respect to one another in the slit plane when the sealing insert is closed. In this case, the specified directions "radial" and "axial" relate to the form, in particular the symmetry, of the through-opening.

To keep the production effort for the sealing inserts as low as possible, it is, however, possible to construct the contour of the slit surfaces only in the axial direction, i.e. in the longitudinal direction of the cable, since their mutual positioning in the radial direction is generally already sufficiently precisely specified by the inserted cable and the inside surface of the through-opening so as to prevent a radial offset.

In a further preferred configuration, the cross-sectional area of the through-opening can also be smaller by a slight tolerance range than the cross-sectional area of the cable guided through it, since this ensures particularly good sealing and/or particularly strong holding forces. This tolerance range depends inter alia on the elasticity of the material of the sealing insert. The tolerance range can be greater than 0.1 mm and smaller than 2 mm, for example. In particular, the tolerance range can be greater than 0.2 mm and smaller than 1.5 mm. The tolerance range can preferably be greater than 0.3 mm and smaller than 1 mm. The tolerance range can be particularly preferably greater than 0.4 mm and smaller than 0.8 mm, i.e. it can be 0.5 mm, for example.

In its through-opening, opposite the gap, the sealing insert can have the compression portion already mentioned above, in the region of which the sealing insert is compressed more strongly than in the other regions of the through-opening when closing, so that, after closing, the sealing insert surrounds an inserted cable by means of the corresponding through-opening with form- and force-fit.

In an advantageous configuration, a sealing insert can have a plurality of through-openings, whereof the slits (i.e. their gaps in the pre-opened state) point in a single direction. In particular, a sealing insert can have four through-openings, namely two front and two rear through-openings of which the two rear through-openings are connected to one of the two front through-openings in each case by their respective slit (by their gap in the pre-opened state). The two front through-openings can be connected to the outer region by their slit (by their gap in the pre-opened state). Such a sealing insert can receive, for example, four cables having a correspondingly small cross-section. In this case, it can have the same external dimensions as another sealing insert which only possesses a single through-opening and only receives a single, yet possibly correspondingly larger, cable, i.e. a cable having a larger cross-section. The latter sealing insert can, of course, possess a larger through-opening and receive a cable with a larger cross-section, for example a power cable, whilst the first-mentioned sealing insert can receive, for example, four signal lines which each possess a smaller cross-section than the power cable. By assembling suitable sealing inserts in a suitable manner, it is thus possible to provide flexibly alterable cable lead-through devices which are configured as required for specific applications.

The sealing inserts to be used in this case are, of course, not restricted to the two explicitly mentioned embodiments. A multiplicity of different cables for which corresponding sealing inserts can be adapted to their cross-sectional area in the same manner are known to the person skilled in the art. The configurations outlined here are merely exemplary in character.

A particularly advantageous cable lead-through device can have at least one, but preferably more, similar and/or different sealing inserts and a corresponding frame for receiving them.

Such sealing inserts are particularly advantageous in conjunction with such a frame, in particular a substantially U-shaped frame, because they are compressed by this frame when integrated therein and thereby already fix the cable in place. They can then undergo final fixing as a result of further, or even final, assembly of the frame.

Such a frame can preferably have two in particular mutually parallel-arranged limbs and a first web which connects these two limbs at their first ends and is aligned in particular at a right angle to the two limbs.

The frame can furthermore have one or more separating walls by means of which individual segments are formed in the frame, wherein a sealing insert can be integrated in each of these segments. In particular, the separating walls can extend parallel to one another and to the limbs of the frame so that the segments can be constructed to be rectangular and/or even square. In particular, the separating walls can be arranged at equidistant intervals so that a plurality of segments of the same size are advantageously formed in the frame.

During the integration of the pre-opened sealing inserts, these can be compressed by the separating walls and/or the limbs, in particular when their slit—their gap in the opened/pre-opened state—points in each case in that direction from which the sealing inserts are inserted into the frame. In this case, cables are advantageously already integrated in the sealing inserts so that they are already held in the respective sealing insert with a certain force.

If the sealing inserts are at least substantially integrated in the frame, the final position of the cables can be corrected, i.e. they can be pushed somewhat deeper in the direction of the sealing insert or pulled out of this from any side. If the cables are located in their final position, the frame can be closed by a second web, wherein the sealing inserts are possibly pushed a final distance into the frame and compressed by the second web for final sealing and strain relief. This can take place in that the second web is screwed to the frame, e.g. by means of screws or similar fastening elements, such as fastening pins, for example, or is latched to the fame, e.g. by means of a latching device. The second web can also be attached to one of the limbs at one side by a hinge and can latch to the other limb in the state in which it is closed in a lever-like manner. In this case, the second web can be attached to the frame such that it is in particular parallel to the first web. By attaching the second web, the cables are ultimately fixed and sealed in their sealing inserts.

A corresponding method for inserting one or more cables into a cable lead-through device, therefore comprising the following steps:

A. inserting one or more cables into one or more automatically pre-opened sealing inserts;
B. integrating the sealing insert(s) into one or more segments of a frame; thereby
C. automatically closing the sealing inserts and holding the cable(s) in the respective sealing insert,
D. correcting the position of the cable(s) in the respective sealing insert;
E. ultimately compressing the sealing inserts for strain relief and for ultimately fixing the cables in the desired position by attaching a second web.

The method can advantageously additionally contain the following step:

fastening the frame to the cable connection region of a plug connector housing. In particular, this housing can be a plug connector housing. In particular, a plug connector modular system, described in detail below, can be arranged in the plug connector housing.

The above-mentioned fastening of the frame to the housing can advantageously take place prior to the method step D. This is advantageous because, by attaching the frame, it is located in its final relative position to the housing and the respective cable length present in the housing can thus be adjusted particularly intuitively before the cable is ultimately fixed in place.

Such a frame, in particular with sealing inserts already inserted and cables received therein, can be screwed to and/or in a housing. The frame can therefore be fastened to a cable connection side of the housing. Strain-relieved and sealed, e.g. water-tight, insertion of the cables into the housing can thus be ensured at low cost by simple means and with little operating effort. In particular, the cable length within the housing can be conveniently pre-adjusted in the above-mentioned manner before the cable is ultimately fixed in place. The cable can then be fixed in its final position by attaching the web to the frame.

In practice, it is particularly advantageous to combine the above-mentioned cable lead-through device with a plug connector modular system. In particular, simplified handling can be facilitated considerably by using the pre-opened sealing inserts when adapting to the requirements of the modular system. The total manual effort involved in assembling such a plug connector modular system, including the assembly involving the strain-relieved and sealed cable insertion, is eased considerably and, as such, remains acceptable for potential customers. In the end, this is a substantial selling point.

Therefore, for better understanding, several plug connector modular systems shall be explained in detail below and included in the disclosure content of this application.

Plug connector modular systems are used to enable a plug connector, in particular a heavy rectangular plug connector, to be adapted flexibly to particular requirements in terms of the signal and energy transmission between two electrical devices, for example. To this end, plug connector modules are conventionally inserted into corresponding plug connector modular frames, which can also be referred to as holding frames, jointed frames, module frames or modular frames, amongst other things. The plug connector modular frames therefore serve for receiving a plurality of mutually similar and/or different plug connector modules and fastening these securely to a surface and/or in a plug connector housing or the like.

The plug connector modules generally each possess a substantially box-shaped insulating body. These insulating bodies can serve for example as contact carriers and receive a wide variety of contacts and fix these in place. The functionality of a plug connector formed thereby is therefore very flexible. For example, pneumatic modules, optical modules, modules for transmitting electrical energy and/or electrical analog and/or digital signals can be received in the respective insulating body and therefore be used in the plug connector modular system. Plug connector modules increasingly also assume measuring and data-technology functions.

Within a plug connector modular frame, also referred to as a holding frame, module frame, jointed frame or modular frame, disclosed in numerous printed documents and publications, exhibited at trade fairs and are often used in the industrial field in heavy duty plug connectors. For example, they are described in the printed documents DE 10 2013 106 279 A1, DE 10 2012 110 907 A1, DE 10 2012 107 270 A1, DE 20 2013 103 611 U1, EP 2 510 590 A1, EP 2 510 589 A1, DE 20 2011 050 643 U1, EP 0 860 906 A2, DE 296 01 998 U1, EP 1 353 412 A2, DE 10 2015 104 562 A1, EP 3 067 993 A1, EP 1 026 788 A1, EP 2 979 326 A1, EP 2 917 974 A1, EP 1 801 927 B1, DE 10 2013 1139 976 B4, EP 1 801 927 B1, DE 20 2013 103 611 U1, DE 10 2015 114 703 A1, which are hereby included in the disclosure content of the application.

In this case, a plug connector modular frame in the form of a jointed frame for holding plug connector modules and for installation in plug connector housings or for screwing to wall surfaces is known from the said printed document EP 0 860 906 B1, for example. In this case, the plug connector modules are inserted into the plug connector modular frame. Provided on the plug connector modules are holding means, which cooperate with windows provided on opposing side parts of the plug connector modular frame, wherein the windows consist in cutouts which are formed as openings in the side parts of the plug connector modular frame, which openings are closed on all sides.

Such a plug connector modular frame can be constructed for example as a jointed frame composed of two jointed frame halves connected to one another in a jointed manner, wherein the separation of the plug connector modular frame is provided transversely to the side parts of the jointed frame. Joints are therefore arranged in the fastening ends of the plug connector modular frame so that, when the plug connector modular frame is screwed to a fastening surface, the side parts are aligned at a right angle to the fastening surface, whereby the plug connector modules establish a form-fitting connection with the plug connector modular frame via the holding means.

In a further development, a jointed frame, e.g. according to printed document DE 10 2015 114 703 A1, can have at least one fixing means via which the jointed frame halves can be latched to one another in two positions, an open position and a closed position, which simplifies the fitting procedure considerably.

Also, as described in printed document DE 20 2013 103 611 U1, for example, two holding frame halves, which are suitable for receiving pneumatic modules, amongst other things, can be used, which holding frame halves can be screwed to one another in an extremely stable manner, can be economically produced in a punching and bending technique and screwed together.

Single-part plug connector modular frames can furthermore also be used, which are made from a plastics material, as disclosed for example in printed document EP 1 801 927 B1. This plug connector modular frame is formed as a circumferential collar and has a plurality of separate wall segments on its plug-in side. Two mutually opposing wall segments form a region for integrating a plug connector module in each case, wherein the wall segments have window-like openings which serve for receiving projections which are integrally formed on the narrow sides of the modules.

A plug connector modular frame can furthermore be used, as disclosed for example in printed document DE 10 2013 113 976 B4, which describes a plug connector modular frame for a heavy plug connector for receiving similar and/or different plug connector modules. The plug connector modular frame consists of a base frame which is rectangular in cross-section and has two mutually opposing side parts. A respective cheek part, made from a flexible material, in particular resilient sheet metal, is attached to the side parts. When a plug connector module is inserted into the plug connector modular frame perpendicularly to the frame plane, these cheek parts are initially bent outwards away from the side part. In particular, the cheek parts can possess lugs with latching windows which are suitable for latching the plug connector modules individually in the plug connector modular frame at their latching tabs. The plug connector modules can therefore be pushed into the plug connector modular frame individually and with only a little effort from the cable connection direction and removed again in the opposite direction. The pushed-in plug connector module is held in a fixed and stable manner in the frame plane by the base frame of the plug connector modular frame. In its insertion direction, perpendicularly to the frame plane, they can latch between two mutually opposing lugs in each case by means of their latching tabs. The design allows the plug connector modular frame to be made from metal and therefore enables the necessary protective grounding for power plug connectors. At the same time, this design is essentially advantageous in that the plug connector modules can be pushed in and removed individually without the fastening of the other modules being adversely affected thereby.

The housing to which the cable lead-through device is fastened can therefore be a plug connector housing, in particular a special sleeve housing, which, on its cable connection side, has an opening for integrating and/or adding the frame with the sealing inserts. This is advantageously a plug connector housing which is suitable for receiving a plug connector modular system, e.g. one of the above-mentioned plug connector modular systems. This is advantageous in each case owing to the simplified handling and flexibilization of the cable insertion. Such a cable lead-through device can therefore be attached to a plug connector, which possesses a plug connector modular system, at the cable connection region of its housing, in particular its sleeve housing. The plug connector with the respective plug connector modular system can therefore have such a cable lead-through device, which is particularly advantageous.

The cable lead-through device can have a plurality of different sealing inserts, for example also including at least one sealing insert having a plurality of through-openings. The individual plug connector modules contained in the plug connector can thus be supplied with suitable signals and/or energy via associated cables through the cable lead-through device.

Owing to the suitable selection of the sealing inserts, the cable lead-through device can be ultimately adapted particularly advantageously and, with this, very individually to the requirements of the plug connector modular system, which is likewise assembled individually.

If there is a corresponding need for expansion and/or alteration, the cable lead-through device simply needs to be supplemented by a corresponding sealing insert whereof the through-opening corresponds substantially to the cross-sectional shape and size of the respective cable which is connected to the expanded plug connector module on the cable connection side. The corresponding cable length of the cable belonging to the respective module can also be adapted particularly advantageously as a result of the pre-opened sealing insert. For example, when the second web is not yet attached, the cable can still be moved through the sealing insert to correct its length in the plug connector housing. However, if the second web is attached, the respective sealing insert is ultimately compressed and the respective cable is ultimately fixed and sealed therein.

A particular advantage consists in the fact that not only the manual assembly, but also mechanical assembly, of a plug connector which contains a modular system is facilitated considerably by the use of the pre-opened sealing inserts. Finally, plug connector modular systems are increasingly fitted mechanically, which means that the automation of the cable insertion into the plug connector with simultaneous sealing and strain relief is now additionally also simplified considerably as a result of the pre-opened sealing inserts.

In another configuration, the housing can be a control cabinet housing.

In further configurations, the housing can also be a distribution box and/or a device housing of an electrical device.

In these configurations, it is also particularly advantageous that the cable lead-through device can be adapted simply and flexibly to the number and cross-section of the cables to be inserted.

For leak-tight, e.g. water-tight, fastening, the frame can have a sealing channel with an inlaid sealing ring on its side which faces the housing. On this side, the frame can furthermore have screw openings which each possess an internal thread. The corresponding housing, i.e. the plug connector housing, in particular the sleeve housing but also the control cabinet housing, the housing of the distribution box or the device housing etc., can furthermore have screw lead-through bores without an internal thread.

Screws, by means of which the frame can be screwed to the housing by its screw openings, are advantageously guided through the screw lead-through bores. Therefore, a water-tight connection between the frame and the housing can also be ensured.

In a further embodiment, the second web can also be a constituent part of the housing. For example, this can be the housing of the electrical distribution box or a fuse box, which can be installed outdoors and is thus exposed to atmospheric influences. The housing can possess a cover, e.g. a hinged cover or a sliding cover, which contains the web or at least possesses a part which possesses the functionality of the web with respect to the cable insertion device. The frame with the sealing inserts inserted therein can then be located in a corresponding cutout in the housing, wherein the sealing inserts are already closed and hold the cables which are guided through. By closing the cover, they can undergo their ultimate compression and thus fix the cables to the distribution box with the desired holding force and leak-tightness.

BRIEF DESCRIPTION OF THE DRAWINGS

An exemplary embodiment of the invention is illustrated in the drawings and explained in more detail below. The drawings show:

FIG. 1a an assembled cable lead-through device with cables guided through;

FIG. 1b an assembled cable lead-through device without cables guided through;

Figure 2A:
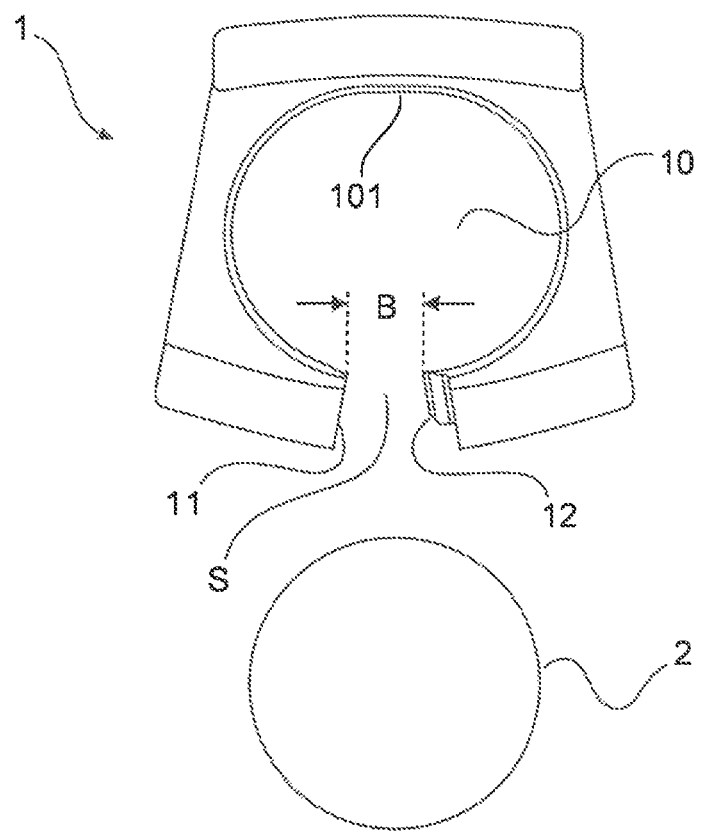
Figure 2B:
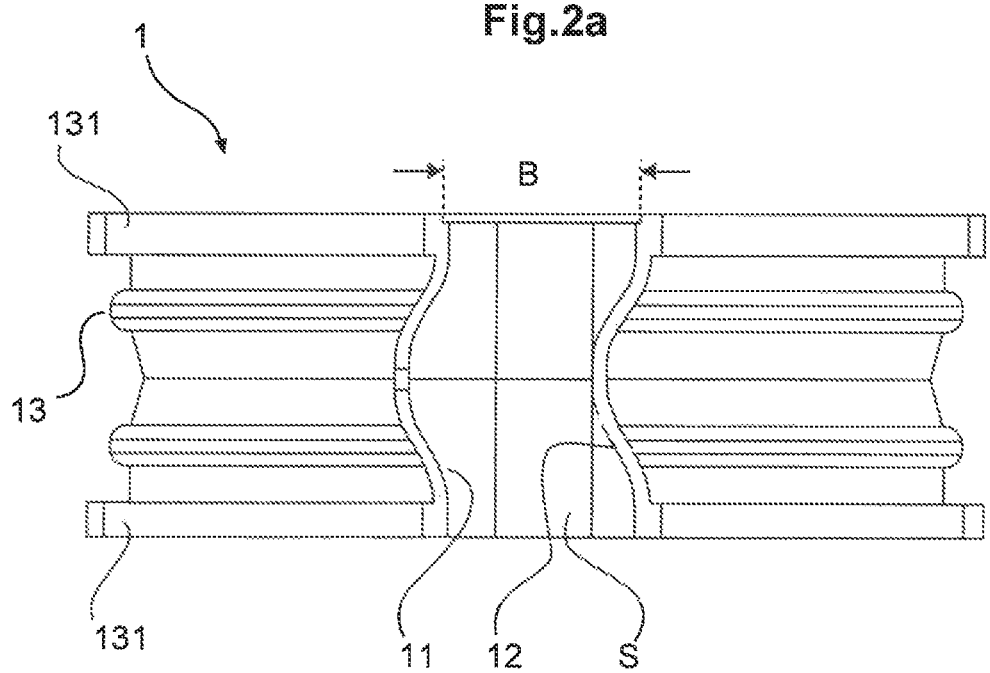
Figure 3A:
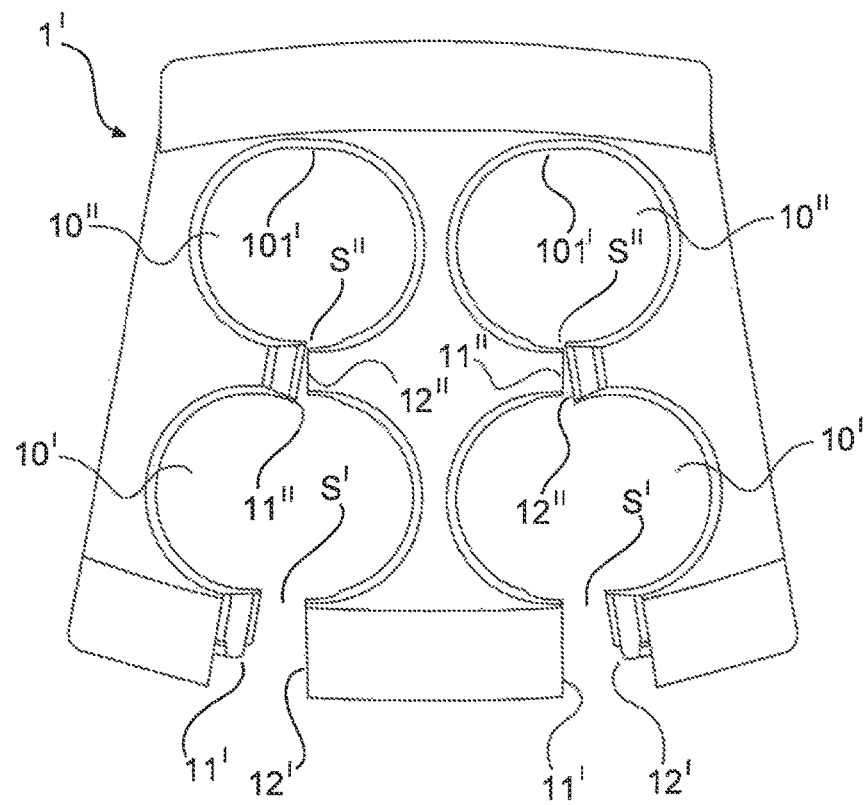
Figure 3B:
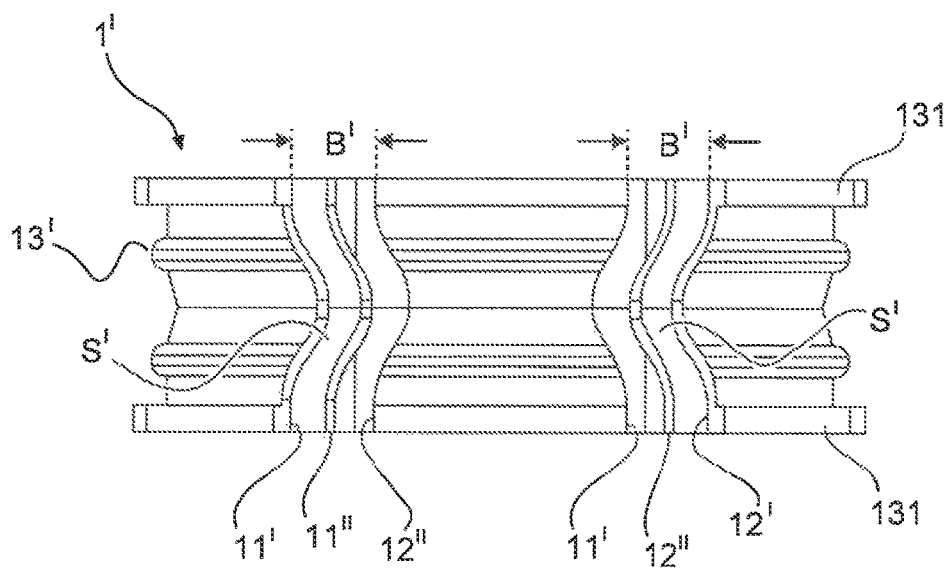

FIC. 1c a dismantled/unassembled cable lead-through device;

FIG. 2a a first pre-opened sealing insert with a first through-opening in a plan view, together with a first cable to be inserted;

FIG. 2b the pre-opened first sealing insert in a front view;

FIG. 3a a pre-opened second sealing insert with four second through-openings in a plan view;

FIG. 3b the pre-opened second sealing insert in a front view.

The figures contain partially simplified, schematic illustrations. Identical reference signs are sometimes used for elements which are similar but possibly not identical. Varying views of similar elements can be drawn to different scales.

DETAILED DESCRIPTION OF THE DRAWINGS

Figure 1A:
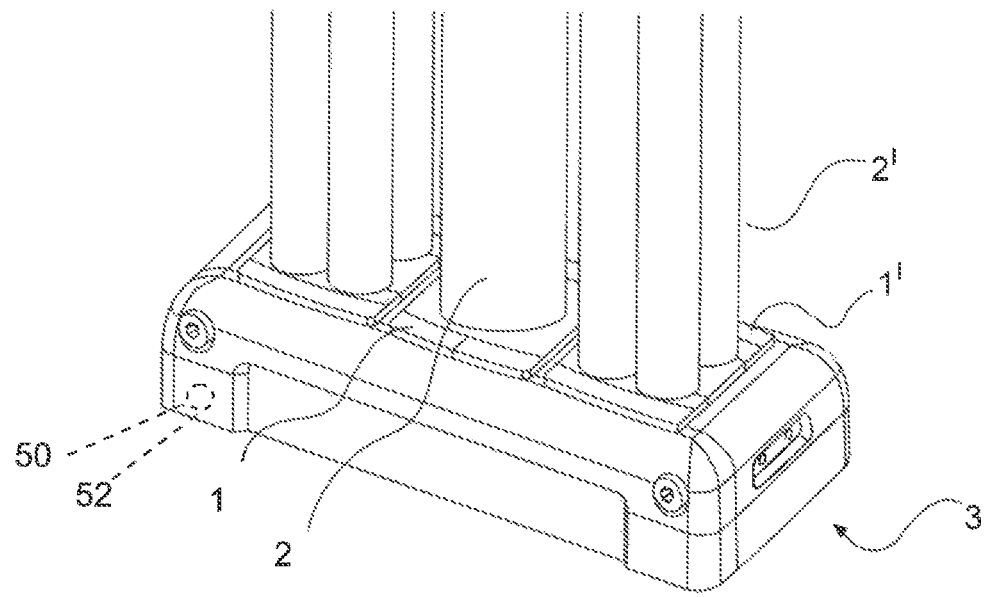

FIG. 1a shows an assembled cable lead-through device, having a frame 3 and three sealing inserts 1, 1' inserted and fixed therein, namely a first sealing insert 1 and two second sealing inserts 1' with cables 2, 2' guided through, namely a first cable 2 and eight second cables 2'. In this case, the cables 2, 2' are ultimately strain-relieved by the sealing inserts 1, 1' and sealed with respect to the cable lead-through device.

Figure 1B:
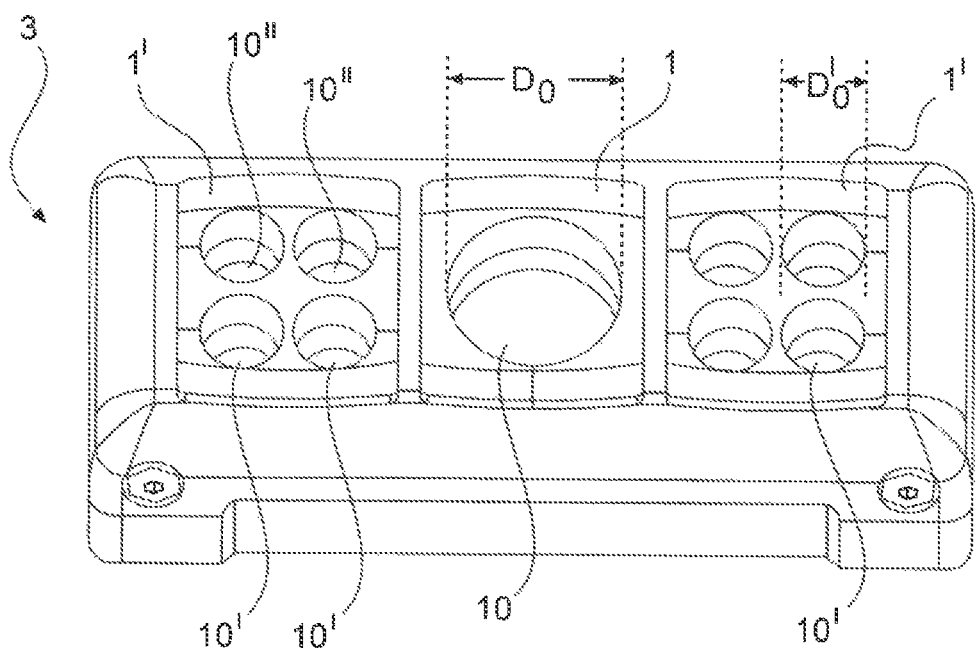

FIG. 1b shows the assembled cable lead-through device without the said cables 2, 2'. It is thus possible to clearly see the three sealing inserts 1, 1' inserted in the frame 3 in their closed state. The first sealing insert 1 inserted into the frame 3 is arranged in the center. It has a first through-opening 10, which is circular in the closed state and has a first diameter $D_0$. The two second sealing inserts 1' each possess four second through-openings 10', 10", namely two front 10' and two rear 10" through-openings, which are arranged with respect to one another in a square pattern. The second through-openings 10', 10" each have a second diameter $D'_0$, which is considerably smaller than the first diameter $D_0$ belonging to the first sealing insert 1.

Figure 1C:
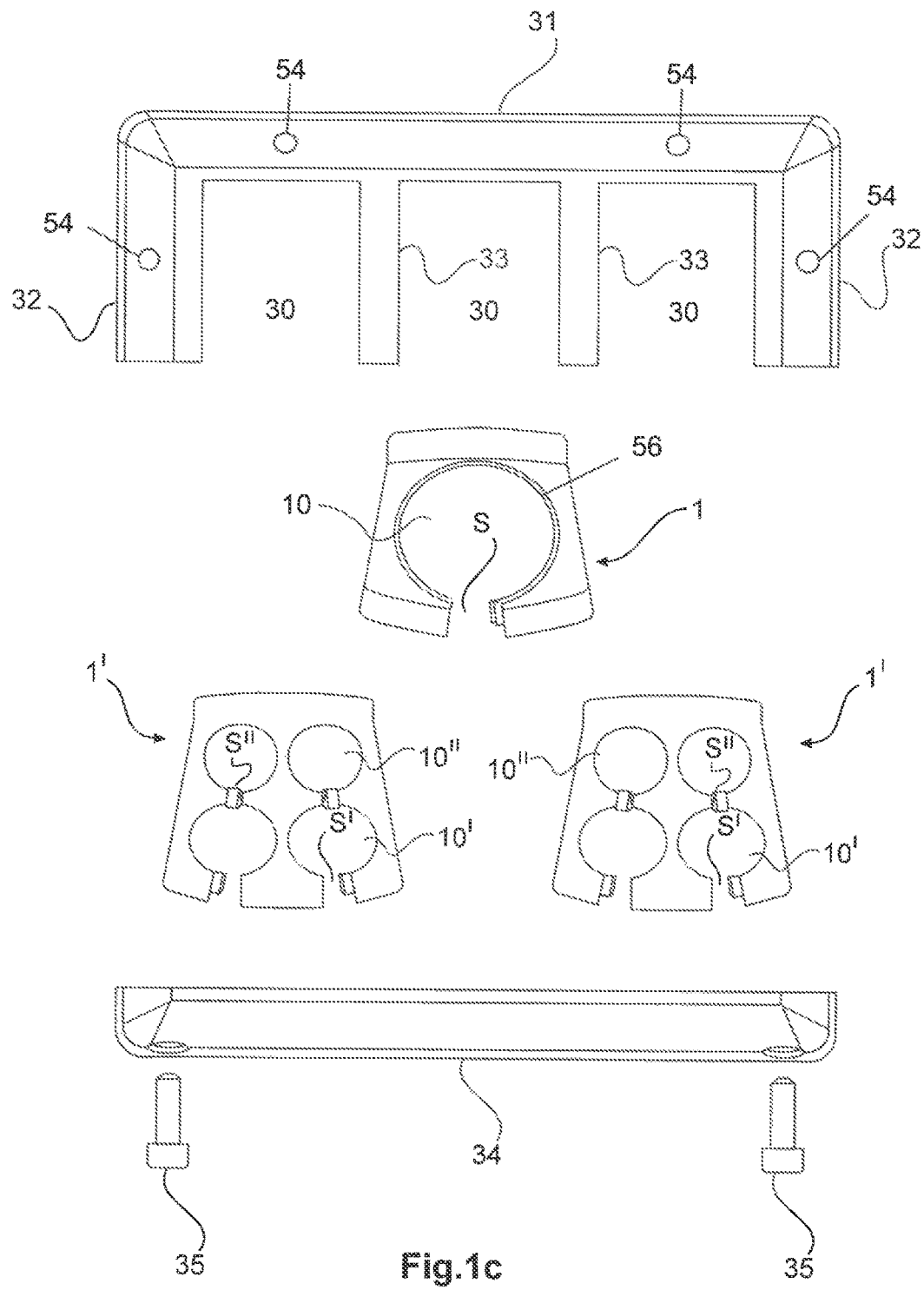

FIG. 1c shows the cable lead-through device in an unmounted/dismantled state in the form of an exploded illustration. The cable lead-through device comprises the first sealing insert 1, the two second sealing inserts 1' and the frame 3. The frame 3 possesses a first web 31, at the ends of which limbs 32 are integrally formed such that they extend away therefrom at a right angle in a common direction. Between these limbs 32, two separating walls 33 are integrally formed on the first web 31 by means of their respective first end such that they are at equidistant intervals and parallel to said limbs. The two webs 32 and the two separating walls 33 possess the same length. Between them, three equally sized segments 30 are thus formed, which are provided for integrating the sealing inserts 1, 1'.

The sealing inserts 1, 1' are furthermore shown, which are located outside the frame 3. It is already clear in this illustration that these sealing inserts 1, 1' are in a pre-opened state without the influence of external forces. At each of their through-openings 10, 10', 10", they thus each possess at least one gap S, S', S" through which a corresponding cable 2, 2' can be inserted laterally into the respective through-opening 10, 10', 10" of the respective sealing insert 1, 1' without great manual effort.

The frame 3 furthermore possesses a second web 34, by means of which the sealing inserts 1, 1' inserted into the frame can be ultimately fixed and compressed for the final fixing of the cables 2, 2' as a result of the frame 3 being closed by means of this second web 34. To this end, the second web 34 can be screwed to the two limbs 32 by means of two screws 35. It 34 then extends parallel to the first web 31. For leak-tight, e.g., water-tight fastening, frame 3 can have a sealing channel shown in phantom at 50 with an inlaid sealing ring also shown in phantom at 52 on its side which faces the housing (not shown). Frame 3 also may include a plurality of screw lead-through openings 54 which serve for guiding through screws for screwing the frame to the sleeve housing at its screw openings (not shown).

FIG. 2a shows the first sealing insert 1 in the pre-opened state with the first cable 2 to be laterally inserted therein, which cable is illustrated in cross-section here and extends longitudinally with respect to the through-opening 10 and therefore longitudinally with respect to the gap S. In the pre-opened state, the gap S possesses a width B. The width B is greater than 5%, in particular greater than 10%, preferably greater than 15% and in particular greater than 20% of the diameter $D_0$ of the first sealing insert 1 in the closed state. In this case, the width B of the gap S should be measured at the point at which the two slit surfaces 11, 12 are at their smallest spacing in the pre-opened state.

It is easily recognizable that the manual effort involved in laterally inserting the cable 2 into the sealing insert 2 is only slight. In particular, this procedure can be carried out using only one hand. However, mechanical assembly can also be simplified thereby. In this case, the cable 2 (shown in cross-section here) already extends in the axial direction of the through-opening 10 and is inserted radially thereto into the through-opening 10 through the gap S.

Opposite the gap S, the sealing insert 1 possesses a compression portion 101 in its through-opening 10, having an internal contour 56 in which the shape and/or hardness create a desired ratio between the sealing on the one hand and a holding force of the strain relief on the other. It is easily recognizable that, although the cable 2 has a circular cross-section, the progression of the through-opening 10 in the pre-opened state initially deviates from a circular form, in particular as a result of his compression region 101.

However, as a result of inserting the cable 2 into the sealing insert 1 and as a result of subsequently inserting the sealing insert 1 into a segment 30 of the frame 3, this compression region 101 is compressed more strongly than the other portions of the through-opening 10 so that the sealing insert 1 surrounds the cable 2 with form- and force-fit for sealing thereof and for strain-relief thereof.

The presence of a circumferential sealing contour 13 can moreover be seen in FIG. 2b. This sealing contour can be integrated into the respective segment with form fit and can reach over the frame 3 at the edge of the segment 30 with its edge regions 131 for improved sealing.

The gap S is delimited on both sides by two slit surfaces 11, 12, namely by a first slit surface 11 and a second slit surface 12.

The two slit surfaces 11, 12 possess a mutually complementary contour with which they interlock for improved sealing and for preventing a mutual displacement as a result of closing the sealing insert. In the present case, this contour is a scalloped contour. However, other similarly-acting contours are conceivable; e.g. rectangular, obtuse-angled or tapered and/or three-dimensional, e.g. spherical segment-like or pyramid-shaped contours are possible.

FIG. 3a shows the second sealing insert 1' in a pre-opened state. In this case, the two front through-openings 10' are each pre-opened by a gap S'. The gap S' is delimited by two slit surfaces 11', 12', which likewise possess a mutually complementary scalloped contour. However, other comparably acting contours are also conceivable. For example, rectangular, obtuse-angled or tapered and/or three-dimensional, e.g. spherical segment-like or pyramid-shaped contours are also possible.

The two rear through-openings 10" are connected to the two front through-openings 10' via a rear gap S". To insert one of the second cables 2', this firstly has to be introduced through the front gap S' into the first through-opening 10' and, from this, through the second gap S" into the rear through-opening 10". The second sealing insert 1' also possess a respective first and a second slit surface 11", 12" on both sides of each of these rear gaps S".

FIG. 3b shows the second sealing insert 1' from the cable insertion direction, i.e. looking onto the two front gaps S'. These provide a view of the respective underlying first 11" or second slit surface 12" of one of the rear gaps S" in each case.

In the pre-opened state, the front gaps S' possess a width B' in the region of the smallest spacing between their gap surfaces 11, 12'. This width B' is greater than 5%, in particular greater than 10%, preferably greater than 15% and in particular greater than 20% of the diameter $D'_0$ of the associated through-opening 10' of the second sealing insert 1' in the closed state. The width B' of the front gap S' should therefore be measured at the point at which the two associated slit surfaces 11', 12' possess their smallest spacing in the pre-opened state.

Even when combinations of various aspects or features of the invention are shown in the figures in each case, it is clear to the person skilled in the art—unless indicated otherwise—that the combinations shown and discussed are not the only possible combinations. In particular, mutually corresponding units or feature complexes from different exemplary embodiments can be interchanged with one another.

LIST OF REFERENCE SIGNS

1, 1' first, second sealing insert
10, first through-opening
10', 10" second (front/rear) through-openings
101, 101' first, second compression portion
11, 11', 11" first slit surfaces
12, 12', 12" second slit surfaces
13 sealing contour
131 edge regions of the sealing contour
2, 2' first, second cable
3 frame
30 segments
31 first web
32 limbs
33 separating wells
34 second web
35 screws
S, S', S" gap, front gap, rear gap
B width of the gap
B' width of the front gap
$D_0, D'_0$ diameter of the respective through-openings

The invention claimed is:

1. A sealing system for a cable lead-through device into a housing, said cable lead-through device, having at least one U-shaped frame with at least two limbs and a first web connecting the two limbs at one end in each case, and at least one sealing insert configured to be inserted into or arranged in the frame, wherein the sealing insert(s) arranged in the frame is configured to be ultimately compressed by attaching a second web for strain relief and sealing of the cable, wherein the second web is a constituent part of the housing, and wherein the at least one sealing insert is formed from at least one elastically deformable material and has at least one through-opening configured for guiding through of the at least one cable, wherein the sealing insert possesses at least one slit along the through-opening which forms two mutually opposing slit surfaces so that the sealing insert assumes an opened state for inserting or removing the cable laterally and a closed state for sealing and strain relief of the cable, and wherein the sealing insert, without an influence of external forces, is located in its opened state in which it has a gap at its slit, by which the two slit surfaces are automatically separated from one another.

2. The sealing system as claimed in claim 1, wherein the gap, without the influence of external forces, has a width which is at least 5% of the diameter which the through-opening possesses in the closed state of the sealing insert.

3. The sealing system as claimed in claim 1, wherein the gap, without the influence of external forces, has a width which is at least 10% of the diameter which the through-opening possesses in the closed state of the sealing insert.

4. The sealing system as claimed in claim 1, wherein the gap, without the influence of external forces, has a width which is at least 20% of the diameter which the through-opening possesses in the closed state of the sealing insert.

5. The sealing system as claimed in claim 1, wherein the two slit surfaces have a mutually complementary contour, by which the surfaces can be joined together on the closing of the sealing insert, such that they interlock to create a seal.

6. The sealing system as claimed in claim 5, wherein the complementary contour is a scalloped contour.

7. The sealing system as claimed in claim 1, wherein the sealing insert, in its closed state, surrounds the cable guided through the through-opening with form and force-fit for sealing and strain relief thereof.

8. The sealing system as claimed in claim 1, wherein the sealing insert has a compression portion in at least one through-opening, which is compressed more strongly than the other region of the through-opening on the closing of the sealing insert so that, after closing, the sealing insert surrounds an inserted cable with form and force-fit by the through-opening.

9. The sealing system as claimed in claim 1, wherein the sealing insert furthermore has, in its through-opening, an internal contour in which the shape and/or hardness create a desired ratio between the sealing on the one hand and a holding force of the said strain relief on the other.

10. The sealing system as claimed in claim 1, wherein the elastically deformable material from which the sealing insert is formed is a soft plastics material and/or an elastomeric compound.

11. The sealing system as claimed in claim 1, wherein the sealing insert is constructed in one piece.

12. The sealing system as claimed in claim 1, wherein the frame has one or more separating walls which are arranged between the limbs and are fastened to the first web by their first end and/or are formed in one piece therewith.

13. The sealing system as claimed in claim 12, wherein a plurality of segments for receiving the sealing inserts are formed by the one or more separating walls in the frame.

14. The sealing system as claimed in claim 13, wherein the respective sealing insert is configured to be transferred from its opened state to its closed state as a result of inserting the sealing insert into the respective segment.

15. The sealing system as claimed in claim 1, wherein the second web, as a separate component, is a constituent part of the frame.

16. The sealing system as claimed in claim 1, wherein the frame has a plurality of screw openings and a sealing groove having an inlaid sealing ring to ensure the frame is screwed onto the housing with good leak-tightness.

17. The sealing system as claimed in claim 16, wherein the housing is a plug connector housing.

18. The sealing system as claimed in claim 17, wherein the plug connector housing is configured to receive a plug connector modular system.

19. The sealing system as claimed in claim 17, wherein the plug connector housing is a sleeve housing which has an opening for adding the cable lead-through device on the cable connection side, wherein the sleeve housing furthermore possesses a plurality of screw lead-through openings which serve for guiding through screws for screwing the frame to the sleeve housing at its screw openings.

20. The sealing system as claimed in claim 1, wherein the housing is the housing of a control cabinet, a distribution box or an electrical device.

* * * * *